United States Patent
Desarzens et al.

(10) Patent No.: US 9,894,851 B2
(45) Date of Patent: Feb. 20, 2018

(54) METHOD AND SYSTEM FOR MANUFACTURING AN IRRIGATION PIPE

(71) Applicant: Maillefer SA, Ecublens (CH)

(72) Inventors: Philippe Desarzens, Blonay (CH); Elmar Mock, Bienne (CH); Florian Kaufmann, Solothurn (CH); Samuel Malzach, Biel (CH); Andre Klopfenstein, La Neuveville (CH)

(73) Assignee: MAILLEFER SA, Eucublens (CH)

( * ) Notice: Subject to any disclaimer, the term of this patent is extended or adjusted under 35 U.S.C. 154(b) by 595 days.

(21) Appl. No.: 14/408,777

(22) PCT Filed: Mar. 15, 2013

(86) PCT No.: PCT/EP2013/055367
§ 371 (c)(1),
(2) Date: Dec. 17, 2014

(87) PCT Pub. No.: WO2013/189618
PCT Pub. Date: Dec. 27, 2013

(65) Prior Publication Data
US 2015/0181816 A1    Jul. 2, 2015

(30) Foreign Application Priority Data
Jun. 18, 2012    (CH) ...................... 0849/12

(51) Int. Cl.
*B29C 47/02*    (2006.01)
*A01G 25/02*    (2006.01)
(Continued)

(52) U.S. Cl.
CPC ........ *A01G 25/026* (2013.01); *B29C 47/0023* (2013.01); *B29C 47/028* (2013.01);
(Continued)

(58) Field of Classification Search
CPC ... B29C 66/532; B29C 66/61; B29C 66/1122; B29C 65/7838; B29C 66/522;
(Continued)

(56) References Cited

U.S. PATENT DOCUMENTS 4,191,518 A    3/1980    Kojimoto et al.
5,271,786 A *  12/1993   Gorney ............... B29C 47/0023
                                                        156/229
(Continued)

FOREIGN PATENT DOCUMENTS

EP    1006778    6/2000
EP    1403025    3/2004
(Continued)

OTHER PUBLICATIONS

International Search Report for PCT/EP2013/055367 dated Jul. 23 2013.

*Primary Examiner* — Jun Yoo
(74) *Attorney, Agent, or Firm* — Pearne & Gordon LLP

(57) ABSTRACT

A piece insertion method for a pipe, for example an irrigation pipe, including:
ejecting at least one piece, for example a dripper, from an ejection unit,
advancing the at least one dripper inside the irrigation pipe by a dripper advancing unit,
lifting the dripper towards the inner surface of the irrigation pipe by using a lifting device such that the dripper is parallel or substantially parallel to this inner surface of the irrigation pipe on impact with this inner surface. The method according to the invention allows also coordination between the lifting device, the ejection unit and the dripper advancing unit such that the dripper spacing can be maintained in tight tolerances.

9 Claims, 5 Drawing Sheets

(51) Int. Cl.
- *B29C 47/00* (2006.01)
- *B29C 65/00* (2006.01)
- *B29C 47/90* (2006.01)
- *B29C 47/92* (2006.01)
- *B29C 65/02* (2006.01)
- *B29C 65/78* (2006.01)
- *B29D 23/00* (2006.01)
- *B29C 47/10* (2006.01)
- *B29C 65/48* (2006.01)
- *B29C 47/88* (2006.01)

(52) U.S. Cl.
CPC ............ *B29C 47/903* (2013.01); *B29C 47/92* (2013.01); *B29C 65/028* (2013.01); *B29C 65/7838* (2013.01); *B29C 66/1122* (2013.01); *B29C 66/522* (2013.01); *B29C 66/532* (2013.01); *B29C 66/61* (2013.01); *B29C 66/8242* (2013.01); *B29C 66/8244* (2013.01); *B29C 66/8322* (2013.01); *B29C 66/8362* (2013.01); *B29C 66/934* (2013.01); *B29D 23/001* (2013.01); *B29C 47/0064* (2013.01); *B29C 47/1036* (2013.01); *B29C 47/8835* (2013.01); *B29C 47/8895* (2013.01); *B29C 47/908* (2013.01); *B29C 65/48* (2013.01); *B29C 66/872* (2013.01); *B29C 66/93411* (2013.01); *B29C 66/93431* (2013.01); *B29C 2947/928* (2013.01); *B29C 2947/92066* (2013.01); *B29C 2947/92076* (2013.01); *B29C 2947/92333* (2013.01); *B29C 2947/92561* (2013.01); *B29C 2947/92571* (2013.01); *Y10T 29/49432* (2015.01); *Y10T 29/53539* (2015.01)

(58) Field of Classification Search
CPC ............ B29C 66/8242; B29C 66/8322; B29C 47/903; B29C 66/8244; B29C 47/0023; B29C 47/028; B29C 47/92; B29C 65/028; B29C 47/908; B29C 47/8835; B29C 66/93431; B29C 66/93411; B29C 65/48; B29C 66/872; B29C 2947/928; B29C 2947/92561; B29C 2947/92066; B29C 2947/92076; B29C 47/1036; B29C 47/0064; B29C 2947/92333; B29C 2947/92571; B29C 47/8895; Y10T 29/49432; Y10T 29/53539

See application file for complete search history.

(56) References Cited

U.S. PATENT DOCUMENTS

| | | | |
|---|---|---|---|
| 5,282,916 A | | 2/1994 | Bloom |
| 5,676,897 A | * | 10/1997 | Dermitzakis ........ A01G 25/026 239/542 |
| 6,179,949 B1 | | 1/2001 | Buluschek |
| 9,192,542 B2 | * | 11/2015 | Blenk .................. A61H 19/44 |
| 2011/0056619 A1 | | 3/2011 | Guichard et al. |

FOREIGN PATENT DOCUMENTS

| | | |
|---|---|---|
| EP | 1817955 | 8/2007 |
| EP | 2227942 | 9/2010 |
| WO | 9955141 | 11/1999 |

* cited by examiner

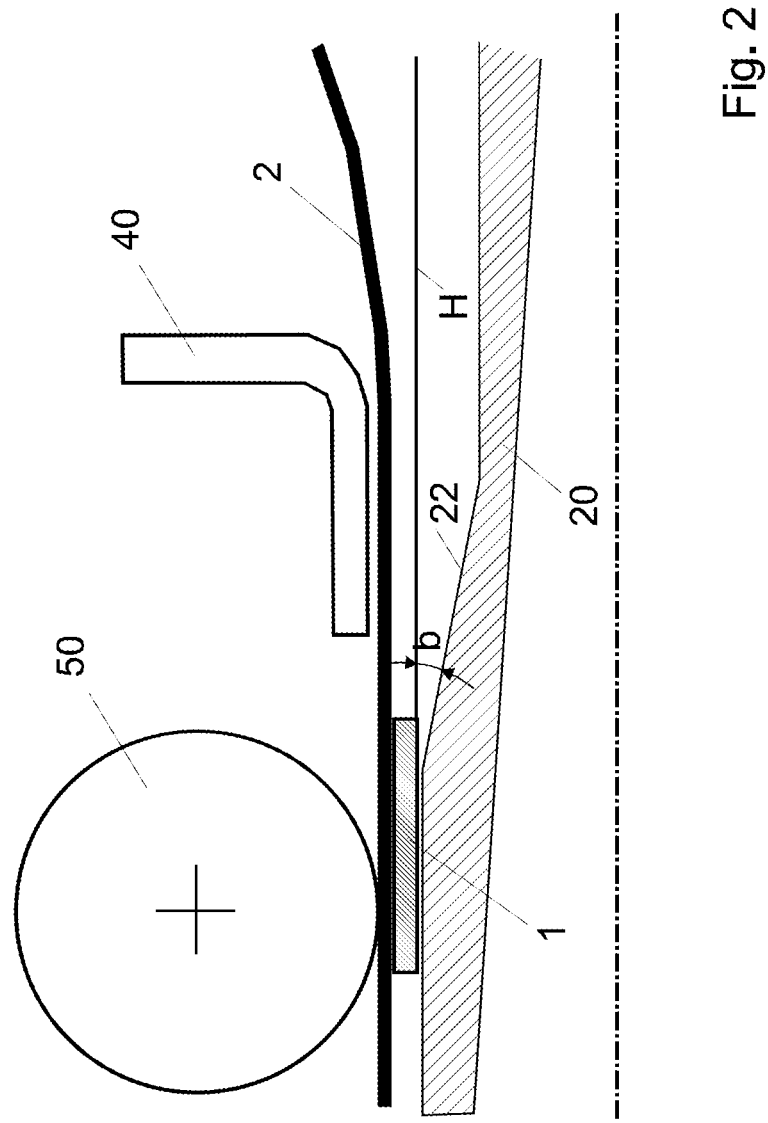

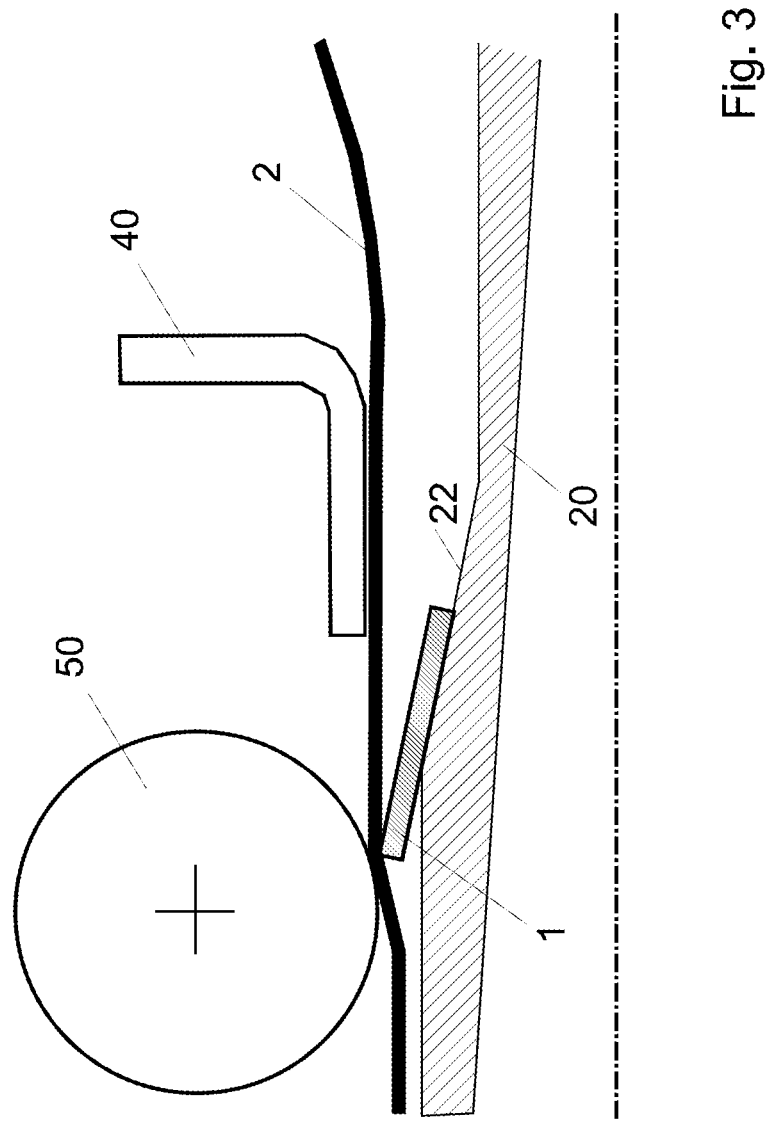

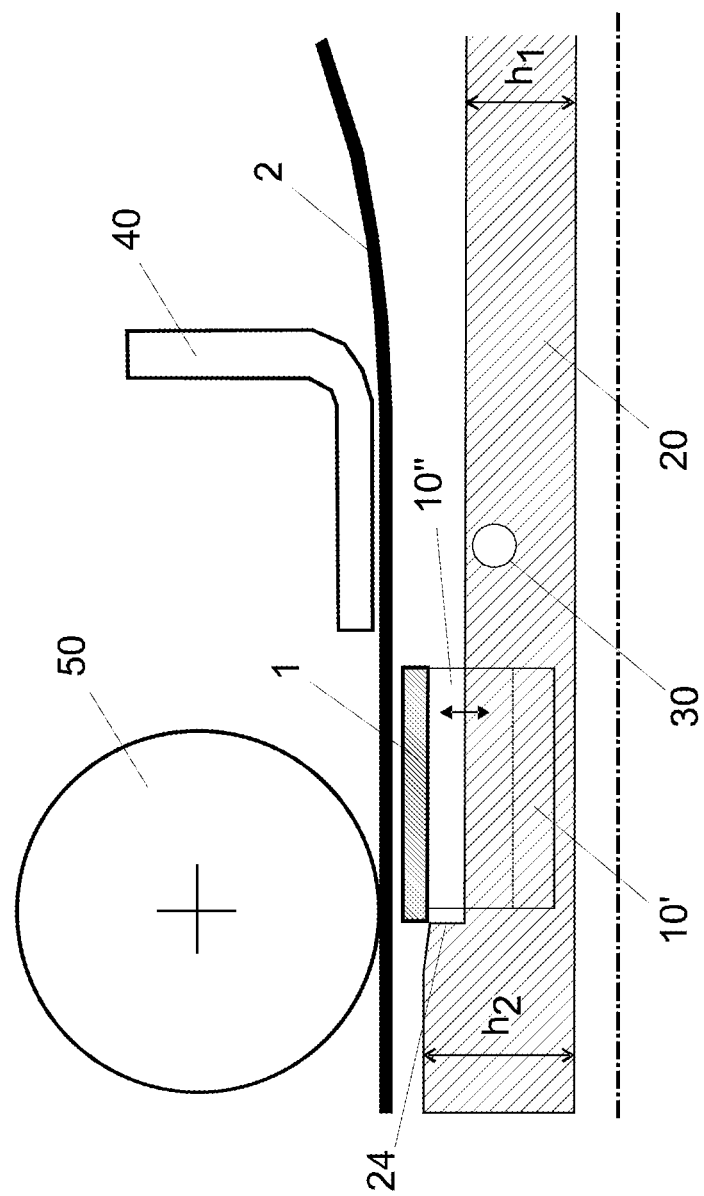

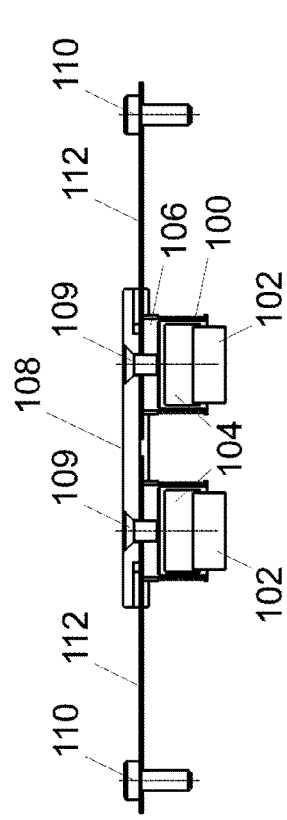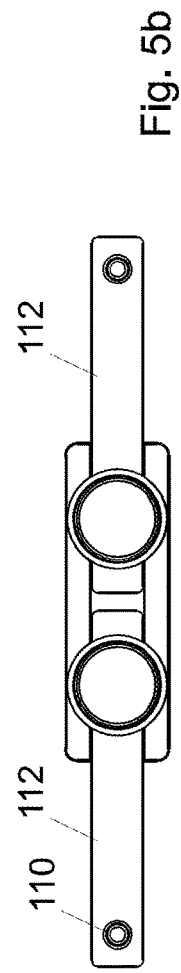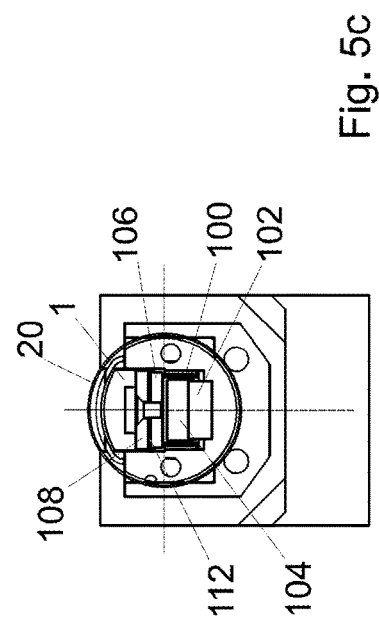

METHOD AND SYSTEM FOR MANUFACTURING AN IRRIGATION PIPE

FIELD OF THE INVENTION

The present invention concerns a method for manufacturing a pipe by using an extrusion process, in particular an irrigation pipe, for example a drip irrigation pipe, and a system for manufacturing this pipe. The present invention concerns also a piece insertion method and a device for this piece insertion. The piece is for example a dripper.

DESCRIPTION OF PRIOR ART

Some irrigation techniques use so-called "drip" irrigation pipes or hoses. The expression "drip irrigation pipe" indicates in this context an irrigation pipe, e.g. made of polymeric material, pierced at pre-determined intervals by holes of small diameter, through which water can flow towards the ground. A dripper or drip element, which is a flow limiter, can be provided at each hole for precisely controlling the flow from the holes. It is generally made of plastic material and it is attached to the inner wall of the irrigation pipe during its manufacturing.

Since irrigation pipes have a fixed cross-sectional profile, an extrusion process is generally used for their manufacturing. A system for manufacturing irrigation pipes generally comprises an extrusion unit, a calibrator unit for regulating the diameter of the pipes, a cooling unit for cooling the pipe—comprising a liquid cooling tank which is some tens of meters long and a cooling liquid, e.g. water, inside the tank—and a traction unit for drawing the pipe through the liquid cooling tank. The speed of the irrigation pipe inside the liquid cooling tank is generally higher than 150 m/min, e.g. 200 m/min.

The drippers can be regularly fed into the extrusion unit and then into the irrigation pipe by an ejection unit or dripper insertion unit comprising orienting means for feeding the drippers to the extrusion unit along a determined orientation.

The extrusion unit cooperates with a mixer unit for mixing different substances such as for example several polymers with a fraction of carbon black. The extrusion unit can comprise more than one extrusion head in order to produce for example an irrigation pipe with several layers.

An insertion stick is an element that protrudes through the extrusion unit for a certain length inside the pipe being extruded. Drippers ejected from the ejection unit are guided into contact with the inner surface of the irrigation pipe by this insertion stick.

The drippers are advanced on the insertion stick by a dripper advancing unit and are put into contact with the inner surface of the pipe when the polymer material is still in the molten state. The dripper advancing unit can be of different types: known devices include moving belts that impart a constant velocity on the drippers, mechanical devices that advance the drippers in discrete stop-and-go strokes, pneumatic systems where drippers are pushed forward by an air flow, etc. Other known systems may be used as well.

The extrusion unit and the dripper advancing unit can be the same unit.

A perforating unit is provided for drilling the irrigation pipe at appropriate locations in correspondence of each dripper to make the dripper functional. The perforating unit can comprise one or more perforating heads.

Beyond the traction unit there is a winding unit for winding the pipe onto a spool. A buffer can be provided between the traction unit and the winding unit.

As discussed the insertion stick guides the drippers to the point of contact with the pipe, where the dripper will be hot-welded to the pipe, by exploiting the heat of the pipe. The hot-welding necessitates that each dripper is pressed with a certain force against the inner surface or wall of the irrigation pipe. There is then a need for another surface opposite to the insertion stick and belonging for example to the calibrator or to the pinching wheels or to belts in order to make the pressing of each dripper against the inner surface of the irrigation pipe effective.

FIG. 1 shows a known dripper insertion device. The insertion stick 20 is fixed and drippers 1, ejected by an ejection unit not illustrated, are advanced on the insertion stick. The illustrated dripper 1 is then led into contact with the inner surface of an irrigation pipe 2, which has been calibrated by a calibrator unit 40.

The insertion stick forms with the illustrated horizontal line H a "low" angle "a", which normally belongs to the range 2°-20°.

The contact between the dripper 1 and the irrigation pipe 2 illustrated on FIG. 1 is smooth. However the contact point between the dripper 1 and the inner surface of the irrigation pipe 2 is not very precisely defined, such that the tolerances of dripper spacing, i.e. the distance between two consecutive drippers, may be relatively large.

FIG. 2 illustrates another known solution which allows an improvement of the precision of the location of the drippers. In the illustrated solution the insertion stick 20 comprises a ramp 22 at a fixed location, which forms with the illustrated horizontal line H an angle "b" in general higher than the angle "a".

The main drawback of the solution illustrated on FIG. 2 is the strong effect of the dripper 1 on the pipe 2 on impact, as illustrated on FIG. 3. In fact the inclination of the dripper 1 on impact leads to a deformation in the inner surface of the irrigation pipe 2 which then can weakened or even be perforated.

Furthermore, contact forces and pressures are not equal along the dripper 1 such that its welding is not uniform: in general the dripper 1 is better welded at its front end than its rear end.

EP1006778, EP1817955 and US2011/0056619 describe a setup as illustrated in FIG. 2.

WO9955141 concerns a device for the manufacture of a drip irrigation conduit in which, after that the emitter has been placed on the interior surface of the tube, a mobile part of the calibrator is displaced radially towards the tube. This radial displacement is effected with the assistance of a driving mechanism comprising a rotating cam which radially raises the mobile part only after that the emitter has been placed on the interior surface of the tube.

EP1403025 concerns a device for continuously producing drip irrigation tubes comprising a feeding device for feeding dosing elements into the tube body comprising a pressing element that is formed by the end area of the guideway. The device comprises also a pressing member that can be pressed against the tube body from the exterior in the vicinity of pressing element. The pressing element is fixed and is not configured for displacements.

EP2227942 concerns a device for producing a drip irrigation tube comprising a device for pressing and connecting the metering elements in the tube body, i.e. a roller outside the tube body, disposed in a pre-cooling chamber. A fixed ramp allows the metering elements to contact the tube body.

U.S. Pat. No. 4,191,518 concerns a method for producing a pipe, comprising a tubular body longitudinally partitioned by diaphragm into two conduits and having barriers projecting from the diaphragm into one of the conduits at the positions spaced along the length of the conduits and extending to contact intimately with the inside wall of the conduit.

U.S. Pat. No. 5,282,916 describes a method for making a drip irrigation device wherein each dripper unit is arrested as it arrives at a first location where the extruded tube is still tacky, and is then moved transversely to bring it into light contact with the tacky surface of the extruded tube to cause the dripper unit to lightly adhere to the tube.

It is an aim of the present invention to obviate or mitigate one or more of the aforementioned disadvantages.

BRIEF SUMMARY OF THE INVENTION

The aim of the present invention is to provide a piece insertion method and device which allow a damage-free insertion of one or more pieces inside a pipe produced by an extrusion process. Advantageously each piece comprises at least a layer or surface which enters in contact with the inner surface of the pipe and which is made by a material suitable to be hot-welded to the pipe, by exploiting the heat of the pipe. For example each piece can comprise a polymeric surface or an adhesive or a lacquer layer to enable the "sticking" effect by using the heat of the pipe.

In a preferred embodiment the inserted piece is a dripper.

The aim of the present invention is to provide a piece insertion method and device which allow the reduction or the elimination of the piece impact deformation of the extruded pipe.

Another aim of the present invention is to provide a piece insertion method and device which allow an improved precision of the piece spacing.

According to the invention, these aims are achieved by means of a piece insertion method according to the claims, by means of a piece insertion device according to the claims, by means of a method for manufacturing a pipe according to the claims and by means of a system for manufacturing a pipe according to the claims.

The piece insertion method for a pipe, for example an irrigation pipe, according to the invention comprises:
ejecting at least one piece from an ejection unit,
advancing the piece inside the pipe by a piece advancing unit,
lifting the piece towards the inner surface of the pipe by using a lifting device.

In a preferred embodiment the expression "lifting device" designates a device that acts as a springboard for the piece. In other words the lifting device catapults the piece "on air" inside the tube. It is then clear that before the lifting, the piece is not placed on the interior surface of the pipe. In another embodiment the lifting device acts as a lift and supports the piece until entering into contact of the piece with the inner surface of the pipe. In this case the lifting device can also exert some pressing force on the inner surface of the pipe.

According to another aspect, the invention also relates to a piece insertion method for hot-welding pieces at a plurality of spaced positions within an extruded pipe, comprising the steps of:
during extrusion of said pipe, advancing said pieces along a track with said pipe;
controlling an catapult unit within said pipe for successively catapulting said pieces against the inner surface of the extruded pipe, in order to weld said pieces against said inner surface.

Advantageously the piece, for example a dripper, is maintained parallel or substantially parallel to the inner surface by the lifting device on impact with the inner surface of the pipe, for example an irrigation pipe, allowing a damage-free insertion.

In the case of a lifting device supporting the piece until when it enters into contact with the inner surface of the pipe, the piece can be maintained parallel to the inner surface by the lifting device on impact. In the case of a lifting device acting as a springboard and catapulting the piece "on air" inside the tube, the piece on impact can be substantially parallel to the inner surface.

In this context the expression "substantially parallel" means that an angle can exist between the inner surface of the irrigation pipe and the lifted piece when this piece impacts the inner surface of the pipe. The amplitude of this angle belongs to the range −15°-+15°, preferably to the range −5°-+5°.

In a preferred embodiment the lifted piece comprises two ends, a first or front end and a second or rear end, opposite to the first end. A positive angle amplitude indicates that this angle is between the first end of the piece and the inner surface of the pipe. A negative angle amplitude indicates that this angle is between the second end of the piece and the inner surface of the pipe.

In a preferred embodiment the lifting device is parallel to the inner surface of the pipe. After its lifting and on impact with the pipe the piece can then be parallel or substantially parallel to the inner surface of the pipe.

Since the piece is maintained parallel or substantially parallel to the inner surface of the pipe on impact with this inner surface, the risks of impact deformation of the pipe are eliminated or at least greatly reduced. Moreover the parallelism on impact between contacting surfaces of the piece and of the pipe ensures an even and uniform welding of the dripper to the irrigation pipe.

The inventive method allows to precisely define the contact point between the piece and the inner surface of the pipe such that the piece spacing, i.e. the distance between two consecutive pieces, is constant.

The position of the contact point is determined by knowing the speed of the pipe and/or the time between two consecutive lifting movements and/or the distance between the pipe and the lifting device and/or the advancing speed of the pieces.

It is possible for example to vary the time between two consecutive lifting movements in order to control the desired piece position on the inner surface of the tube.

In the case of a lifting device acting as a springboard, the presence of an angle belonging to the range −15°-+15° between the piece and the inner surface of the pipe does not lead to a perforation in the inner surface of the pipe. Tests realized by the applicant have shown that the impact zone of the inner surface of the pipe is less weakened than the known solution illustrated on FIG. 2 or not weakened at all. In fact, according to the inventive method, the piece is not forced by a ramp for contacting the inner surface of the pipe, but it is simply lifted.

After the lifting and before the contact with the inner surface of the pipe, the piece can tilt or can be tilted up such that on contact it forms a little angle with the inner surface of the pipe. In particular it is possible that the front end of the piece enters in contact with the inner surface of the pipe before the rear end. Thus, a small angle between the inner surface of the pipe and the upper surface of the piece on impact may be voluntarily provided for ensuring deeper penetration of the front end of the piece within the hot inner surface of the pipe. However, since the inner surface is not fixed but it is drawn during the extrusion process, the rear end of the piece enters in contact with the inner surface automatically such that the welding of the piece with the pipe is more even and uniform than in the prior art. Of course, this applies also if the rear end of the piece enters in contact with the inner surface of the pipe before the front end.

It is also possible to project the piece towards the inner surface of the pipe in a direction that comprises a first component radial to the pipe, and a second component parallel to the longitudinal axis of the pipe.

The lifting device has a fixed position and can for example belong to the insertion stick. Piece spacing depends then on piece ejection rate precision and/or the piece advancing rate precision and can be maintained in tolerances tighter than known solutions.

The lifting mechanism can be actuated by a mechanical, electro-mechanical, electromagnetic, magnetostrictive, purely electric or any other kind of actuator that brings the dripper into contact with the pipe. The lifting mechanism can be based for example and in a non limitative way on electromagnetic coils, on a piezoelectric, mechanical, pneumatic or electro-pneumatic device, etc.

In a preferred embodiment the lifting device is actuated by one or more voice coil actuators similar to those attached to the apex of a loudspeaker cone. Each voice coil is wound around a core made by two layers, the lower layer comprising a permanent magnet and the upper layer a metal. By driving a current through the voice coil, a magnetic field is produced. The voice coil reacts to this magnetic field from the fixed permanent magnet, thereby moving upwardly and downwardly.

In a preferred embodiment the voice coils are placed close to the end of the insertion stick, after the calibrator unit.

In another embodiment the same cooling liquid, e.g. the cooling water, used for avoiding the piece to glue on their supports, is used for cooling the voice coils too.

The lifting motion of the lifting device and the piece motion on the insertion stick need to be coordinated. In one embodiment this coordination is based on the detection of the passage of a piece by a detector. This detector generates a first electrical signal which triggers the lifting of the lifting device. In one embodiment the detector is an infrared detector.

In this embodiment this first electrical signal can be advantageously used for coordinating the lifting with the advancing of the pieces. In particular the first electrical signal can be used for calculating the piece advancing rate.

If the piece advancing unit comprises moving belts that impart a constant velocity on the pieces or mechanical devices that advance the pieces in discrete stop-and-go strokes, this first electrical signal can be advantageously used for coordinating the lifting with the advancing speed of these devices.

In another embodiment the lifting device itself generates a second electrical signal which can be used for calculating the piece advancing rate.

In another embodiment the piece advancing unit generates a third electrical signal which can be used for calculation of the lifting rate of the lifting device.

In another embodiment the first, second and third signal can be evaluated separately, double or together by an electronic module for the mentioned coordination between the lifting and the advancing of the pieces.

The electronic module can belong to the lifting device and/or to the ejection unit and/or to the advancing unit. In another embodiment the electronic module belongs to a device different from the lifting device, the ejection unit and the advancing unit but connected to them by any kind of wireless or wired connection.

The lifting device, the ejection unit and the advancing unit communicate electronic signals by any kind of wireless or wired connection.

In another embodiment the insertion stick comprises an end stop, which allows to stop the advancing piece and to define then a fixed location for its lifting. The lifting device in this embodiment is placed under the stopped piece. In such a case, a piece detector is not necessary and the coordination between the lifting device and the piece motion on the insertion stick is performed for example by using the mentioned second electrical signal, generated by the lifting device.

The new solution has the advantage that it provides a piece insertion method and device which allow a damage-free insertion of pieces, in particular the reduction or the elimination of the impact deformation of the pipe, and an improved precision of the piece spacing.

The present invention concerns also a method for manufacturing a pipe, for example an irrigation pipe, comprising:
extruding the irrigation pipe from an extrusion unit,
calibrating the diameter of said pipe by a calibrator unit,
drawing the pipe in a cooling unit by a traction unit,
ejecting at least one piece from an ejection unit,
advancing the at least one piece inside the pipe by a piece advancing unit,
lifting said piece towards the inner surface of the pipe by using a lifting device such that the piece is substantially parallel to the inner surface on impact with this inner surface.

In one embodiment the piece is a dripper, the pipe is an irrigation pipe and the method comprises the step of drilling the pipe in correspondence of each dripper by a perforating unit.

The present invention concern also a system for manufacturing a pipe, for example an irrigation pipe, comprising:
an extrusion unit for extruding the pipe,
a calibrator unit for calibrating the diameter of the pipe,
a traction unit for drawing the pipe in a cooling unit,
a piece insertion device comprising:
    an ejection unit for ejecting at least one piece,
    a piece advancing unit for advancing the piece inside the pipe,
    a lifting device for lifting the piece into contact with the inner surface of the pipe such that on impact with the inner surface of the pipe the piece is substantially parallel to this inner surface.

In one embodiment the piece is a dripper, the pipe is an irrigation pipe and the system comprises also a perforating unit for drilling the pipe in correspondence of each dripper.

BRIEF DESCRIPTION OF THE DRAWINGS

The invention will be better understood with the aid of the description of an embodiment given by way of example and illustrated by the figures, in which:

FIG. 2 shows another known dripper insertion device.
FIG. 3 shows some drawbacks related to the dripper insertion device of FIG. 2.
FIG. 4 shows one embodiment of the dripper insertion device according to the invention.
FIGS. 5A to 5C show three views of an embodiment of the lifting device according to the invention.

DETAILED DESCRIPTION OF POSSIBLE EMBODIMENTS OF THE INVENTION

Figure 1:
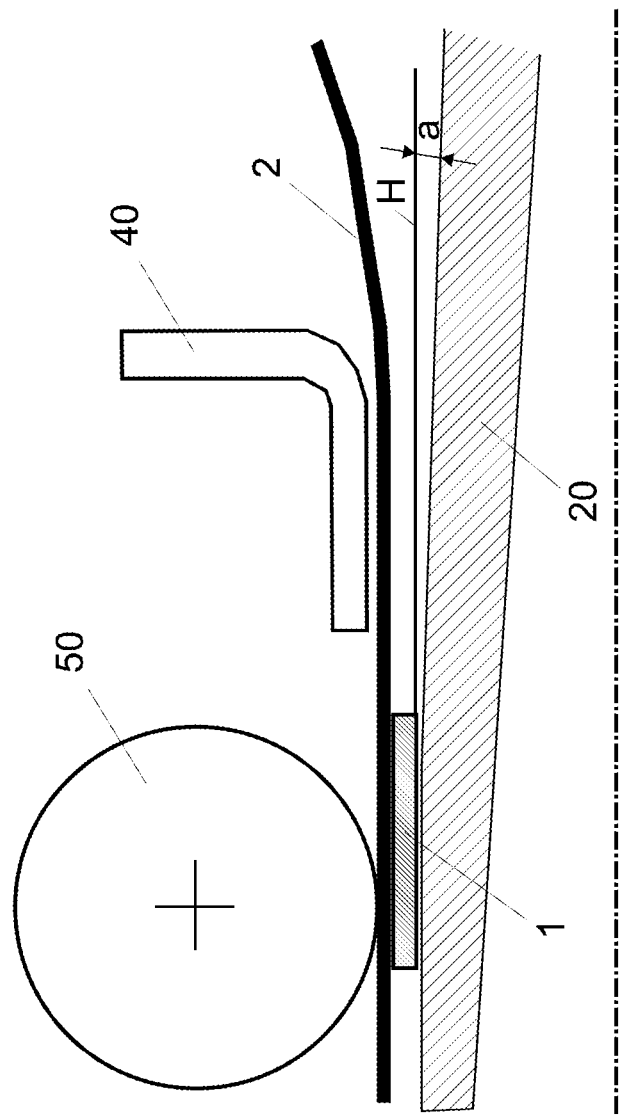
FIG. 1 shows a known dripper insertion device.

FIG. 4 shows one embodiment of the piece insertion device for an extruded pipe 2 according to the invention. The extruded pipe 2 is suitable for containing a fluid, i.e. liquid or a gas. The extruded pipe 2 can be suitable also for containing a solid material.

As discussed the piece 1 comprises at least a layer or surface which enters in contact with the inner surface of the pipe and which is made by a material suitable to be hot-welded to the pipe, by exploiting the heat of the pipe. For example each piece 1 can comprise a polymeric surface or an adhesive or lacquer layer to enable the "sticking" effect by using the heat of the pipe. In a preferred embodiment the inserted piece is a dripper.

In the illustrated embodiment the extruded pipe 2 is an irrigation pipe suitable for containing a liquid, for example some water, and the piece 1 is a dripper.

In the embodiment of FIG. 4 the device according to the invention comprises:
an ejection unit not illustrated for ejecting at least one dripper 1,
a dripper advancing unit not illustrated for advancing the dripper 1 inside the irrigation pipe 2,
a lifting device 10 which advantageously lifts each dripper 1 towards the inner surface of the irrigation pipe 2 such that the dripper 1 is parallel to the inner surface on impact with this inner surface.

The ejection unit can comprise orienting means for feeding the drippers to the irrigation pipe along a determined orientation.

The dripper advancing unit can be of different types: known devices include moving belts that impart a constant velocity on the drippers, mechanical devices that advance the drippers in discrete stop-and-go strokes, pneumatic systems where drippers are pushed forward by an air flow, etc. Other systems may be used as well. In one embodiment the speed of the drawn pipe is higher than the advancing speed of the drippers. In a preferred embodiment the pipe's speed is at least 10 times higher than the drippers' speed.

In one embodiment drippers 1 are fed from a reservoir to a vibrating bowl feeder which aligns the drippers having the flow path surface as the upper surface. The so aligned drippers 1 are feed individually to a moving belt. A dripper buffer can be provided between the vibrating bowl feeder and the moving belt. The moving belt moves the drippers 1 towards the dripper advancing unit that advances dripper on the insertion stick, which extends to the inside of the calibrator unit.

The dripper advancing unit is placed between the moving belt (or in general the ejection unit) and the calibrating unit in order to regulate the advancing speed of the drippers 1 so as to feed them inside the calibrator on the insertion stick with the desired speed. This dripper advancing unit can comprise two arms which pick up and drop off alternatively the drippers 1 and the acts also as regulating unit.

In the described embodiment the ejection unit comprises all the elements before the insertion stick, in particular the reservoir, the vibrating bowl feeder as orienting means, the buffer and the moving belt.

In other embodiment the ejection unit and the dripper advancing unit can be the same unit.

The lifting device 10 allows a damage-free insertion. Since the dripper 1 is maintained parallel to the inner surface of the irrigation pipe during the lifting and on impact with this inner surface, the risks of impact deformation of the irrigation pipe 2 are eliminated or at least greatly reduced.

In the embodiment of FIG. 4 the insertion stick 20 is fixed and the dripper advancing unit comprises pneumatic systems where the dripper 1 is pushed forward by an air flow. The insertion stick 20 is equipped by the lifting device 10.

As discussed, the lifting device 10 can be actuated by a mechanical, electro-mechanical, purely electric or any other kind of actuator that brings the dripper into contact with the pipe.

The lifting mechanism can be based for example and in a non limitative way on electromagnetic coils, on a piezoelectric device, on a mechanical or pneumatic or electro-pneumatic device, etc.

In a preferred embodiment the lifting device is actuated by one or more voice coil actuators 100, illustrated in FIGS. 5A and 5C, similar to those attached to the apex of a loudspeaker cone. Each voice coil 100 is wound around a core made by two layers, the lower layer comprising a permanent magnet 102 and the upper layer a metal 104.

By driving a current through the voice coil 100, a magnetic field is produced. The voice coil 100 reacts to the magnetic field from the fixed permanent magnet 102, thereby causing the moving upwardly and downwardly of the voice coil 100 itself along with the two bending or spring elements 112 which support the dripper 1 through the support element 108. The support element 108 can comprise an insulating material. It has to be suitable for supporting the heat from the pipe and/or from the voice coil. For example it is made of a high quality polymer or of ceramic.

The two elements 112, which are fixed to the insertion stick 20 by the screws 110, act as two springboards causing the lifting of the support element 108 and then of the dripper 1. Another layer of any metal 106, different from iron or any other ferromagnetic metal, is placed between the elements 112 and the layer 104.

As illustrated in FIG. 5C a dripper 1 can then be lifted by the voice coil 100. In the embodiments illustrated on FIGS. 5A and 5B there are two voice coils 110 which allow a fine adjustment of the dripper tilt, such that the dripper 1 is always parallel to the inner surface of the irrigation pipe 2 on impact. However other embodiments comprising only one voice coil, which is easier to control, or more than two voice coils are possible.

In a preferred embodiment the voice coils 100 are placed on the end of the insertion stick after the calibrator.

In another embodiment the same cooling liquid, e.g. the cooling water, used for avoiding the dripper to glue on their supports, is used for cooling the voice coils too.

In one embodiment some elastic energy can be stored in the lifting device before that a piece 1 is placed on it. For example a negative signal can supply the voice coils 100 in order to cause a downward bending of the springs 112. In other words the springs 112 are "pre-loaded". In such a case the piece 1 will be lifted with a bigger power.

In a preferred embodiment the signal supplying each voice coil 100 is periodic square signal with a frequency of about 33 Hz. It is of course possible to vary the amplitude and the temporal length or frequency of each impulse for modifying the lifting of the lifting device.

In another embodiment a negative signal whose amplitude is smaller than the amplitude of the positive impulse can supply the voice coils between two consecutive impulses in order to avoiding undesired oscillations of the system.

In one embodiment the length of the lifting device is smaller than the length of the dripper 1. In a preferred embodiment the lifting device is placed under the dripper 1 such that the center of mass of the dripper is above the lifting device. In a preferred embodiment the middle of the lifting device and of the dripper 1 coincide. In other words the dripper 1 is placed symmetrically on the lifting device. For example the dripper is 30 mm long, the lifting device is 20 mm long and 5 mm at the rear end of the dripper 1 and 5 mm at its front end are not in contact with the lifting device. In such a case the length of the rear section of the dripper which is not in contact with the lifting device is calculated so as to allow the advance of the next dripper during the lifting of the previous one.

According to another embodiment the length of the dripper 1 is smaller than the length of the lifting device. According to another embodiment the dripper 1 is not placed symmetrically on the lifting device: its center of course nevertheless is above the lifting device.

According to another embodiment a ramp, similar to the ramp 22 of FIG. 2 is in any case present for allowing the insertion of the drippers 1 if the lifting device does not work or in case of lack of synchronism.

The lifting motion of the lifting device 10 and the dripper motion on the insertion stick need to be coordinated. In one embodiment this coordination is based on the detection of the passage of a dripper 1 by a detector 30. This detector 30 generates a first electrical signal which triggers the lifting of the lifting device 10, which then moves from a first position 10' to a second position 10".

In this embodiment this first electrical signal can be advantageously used for coordinating the lifting with the advancing of the drippers 1. In particular the first electrical signal can be used for calculating the dripper advancing rate.

If the dripper advancing unit comprises moving belts that impart a constant velocity on the drippers 1 or mechanical devices that advance the drippers in discrete stop-and-go strokes, this first electrical signal can be advantageously used for coordinating the lifting with the advancing speed of these devices.

If the dripper advancing unit comprises pneumatic systems where the dripper is pushed forward by an air flow, this first electrical signal can be advantageously used for calculating the power of this air flow.

In another embodiment the lifting device 10 itself generates a second electrical signal which can be used for calculating the dripper advancing rate. This latter approach allows for intrinsically better precision of the dripper spacing and does not require the use of an additional device as the detector 30.

In another embodiment the dripper advancing unit generates a third electrical signal which can be used for calculation of the lifting rate of the lifting device.

As discussed the first, second and third signal can be evaluated separately, double or together by an electronic module for the mentioned coordination between the lifting and the advancing of the drippers.

The electronic module can belong to the lifting device 10 and/or to the ejection unit and/or to the advancing unit. In another embodiment the electronic module belongs to a device different from the lifting device, the ejection unit and the advancing unit, but connected to them by any kind of wireless or wired connection.

The lifting device 10, the ejection unit and the advancing unit communicate electronic signals by any kind of wireless or wired connection.

In FIG. 4 the insertion stick 20 comprises an end stop 24 which is caused by an abrupt change of thickness of the insertion stick 20 from $h_1$ to $h_2 > h_1$. The height $h_2 - h_1$ of this end stop 24 is at least equal or superior to a fraction of height of each dripper 1, in order to stop it and to define then a fixed location for its lifting.

The lifting device in the embodiment of FIG. 4 is placed in a fixed position under the stopped dripper 1. In such a case the dripper detector 30 is not necessary and the coordination between the lifting device 10 and the dripper motion on the insertion stick is performed for example by using the mentioned second electrical signal, generated by the lifting device 10.

After the lifting device 10, the thickness of the insertion stick 20 is maintained higher, equal to $h_2$, so as to form a support surface for the pinching wheel 50 or in general for a perforating unit.

In one embodiment the lifting device 10 can simply catapult the dripper 1 in contact with the inner surface of the irrigation pipe 2. The pressing of each dripper 1 with a certain force against the inner surface of the irrigation pipe 2 will be performed by using a surface belonging for example to the pinching wheel 50.

In another embodiment the lifting device 10 can exert some pressing force as well.

The parallelism on impact between contacting surfaces of the dripper 1 and of the irrigation pipe 2 ensures an even and uniform welding of the dripper 1 to the irrigation pipe 2.

In the described embodiments the lifting of the piece 1, for example a dripper, is performed inside the pipe 2. However it is possible also to lift the piece 1 such that it enters into contact with the outer surface of the pipe 2. In this case the lifting device is placed outside the pipe 2. The lifting device in such a case can be used for placing on the outer surface of the pipe a mark or a sign for localizing the drippers 1.

The lifting of the piece 1 can be performed before the calibrator unit or inside the calibrator unit or after the calibrator unit.

The pieces 1 can be advanced in constant movement or in sequenced motion (stop and go).

A piece can be a sensor, for example for measuring the flow rate of the liquid inside the pipe. In another embodiment it can be a temperature sensor, a pressure sensor or any other kind of sensor.

According to another embodiment the piece 1 is a transponder comprising means for emitting and/or receiving signals. In an example, after inserting the transponder 1 inside the pipe 2, a hole can be drilled on the pipe 2 in correspondence of the piece 1, for example for connecting the transponder to an external device comprising an antenna by using some wires.

According to another embodiment the piece 1 is an element for reinforcing any kind of extruded pipe 2 before its drilling and/or for assuring its waterproofness and/or airproofness in correspondence of the drilled holes. For example the piece 1 can be a nut cooperating with an external screw. The piece 1 can be in general any piece which can cooperate mechanically and/or electrically with an external piece or device.

According to another embodiment the lifted piece 1 is a stapler hot-welded to the inner surface of the pipe. In such case the elements which have to be fixed to the inner surface of the pipe 2, for example and in a non limitative way drippers and/or LEDs and/or sensors, can be connected by one or more wires as a string of pearls, the pearls being the mentioned elements. The wires can be electric or optical wires. The string can be advanced in constant movement or in sequenced motion (stop and go) over the thermal stapler.

The thermal stapler comprises one or more groove, each groove having a form suitable for containing one or more wires.

As discussed the string is advanced over the staplers. When the wire(s) of the string are over the thermal stapler, it can then be lifted so as to thermally fix it and the wire(s) to the inner surface of the pipe. In other words the stapler acts on the element string such as the clips or fasteners fixing an electric wire on the wall of a house.

The two last embodiments can be combined: in this case the pipe can be drilled in correspondence of the wires and an external device can enter into contact with the wires for example for transmitting and/or receiving a signal. In another embodiment an external device marks the pipe in correspondence of a piece 1 inside the pipe.

According to another embodiment the piece 1 is a polymeric piece comprising a magnetic tape recording some information, for example information about the manufacturing of the pipe 2 or used for tracking purpose. The piece 1 can also comprise a RFID tag, a chip, a memory or any other integrated circuit allowing it to store data.

According to another embodiment the piece 1 is a pastille or lozenge having a controllable solubility. Herbicides, weedkillers, nutrients vitamins or additives can then be dissolved in the fluid contained in the pipe.

According to another embodiment the piece 1 is a "gas dripper", i.e. a dripper which allows some gas in the pipe 2 to come out from the pipe 2 in order to clean up some water or liquid in general, for example the water of the sea, of a river, of a lake, of a dam, of a swimming pool, etc.

REFERENCE NUMBERS USED ON THE FIGURES

1 Piece, for example a dripper or drip element
2 Pipe, for example an irrigation pipe or hose
10 Lifting device
10' Lifting device in a first position
10" Lifting device in a second position
20 Conveying unit or insertion stick
22 Ramp of the insertion stick
24 End stop of the insertion stick
30 Detector of drippers
40 Calibrator
50 Perforating unit or pinching wheel
100 Voice coil
102 Fixed permanent magnet
104 Metal layer
106 Metal layer different from iron
108 Support element
109 Linking element
110 Screw
112 Bending element
a Angle
H Horizontal line

The invention claimed is:

1. A piece insertion method for a pipe; comprising the steps of:
providing a pipe and providing at least one piece to be inserted into said pipe;
ejecting said piece from an ejection unit,
advancing said piece inside said by a piece advancing unit, placing said piece on a lifting device which moves according to an up and down lifting motion and wherein said lifting device is actuated by at least one of the group consisting of an electro-mechanical actuator, an electromagnetic actuator, a magnetostrictive actuator, and an electrical actuator,
catapulting said piece inside the pipe towards an upper inner surface of said pipe using said up lifting motion of said lifting device, such that said piece enters for the first time in contact with said upper inner surface of said pipe, in order to weld said piece against said inner surface, with said piece being parallel or substantially parallel to said inner surface of said pipe on impact with said inner surface.

2. The piece insertion method of claim 1, said piece comprising at least a layer or surface which enters in contact with the upper inner surface of the pipe and which is made by a material suitable to be hot-welded to the pipe.

3. The piece insertion method of claim 1, said piece being a dripper.

4. The piece insertion method of claim 1, comprising:
detecting said piece using a detector,
generating a first electrical signal using said detector when the detector has detected said piece,
triggering the lifting of said lifting device based on said first electrical signal.

5. The piece insertion method of claim 4, comprising:
using said first electrical signal for coordinating the lifting of said lifting device with the advance of said piece.

6. The piece insertion method of claim 5, comprising using said first electrical signal for calculating an advancing rate of said piece advancing unit.

7. The piece insertion method of claim 1, comprising:
using a stop end to stop the piece before it is lifted.

8. The piece insertion method of claim 1, comprising:
generating a second electrical signal using said lifting device,
using said second electrical signal for calculating an advancing rate of said piece advancing unit.

9. The piece insertion method of claim 1, comprising:
welding said piece to said inner surface of said pipe by using the pressure exerted by the lifting device and the heat of the pipe.

* * * * *

UNITED STATES PATENT AND TRADEMARK OFFICE
CERTIFICATE OF CORRECTION

PATENT NO. : 9,894,851 B2
APPLICATION NO. : 14/408777
DATED : February 20, 2018
INVENTOR(S) : Philippe Desarzens et al.

Page 1 of 1

It is certified that error appears in the above-identified patent and that said Letters Patent is hereby corrected as shown below:

On the Title Page

Please correct the Assignee under item (73), as-follows:
(73) MAILLEFER SA, ECUBLENS (CH)

Signed and Sealed this
Fifth Day of November, 2019

Andrei Iancu
*Director of the United States Patent and Trademark Office*